March 7, 1944.
B. E. RICHMOND
2,343,266
FEEDER FOR PRESSURE COOKERS
Filed April 20, 1942
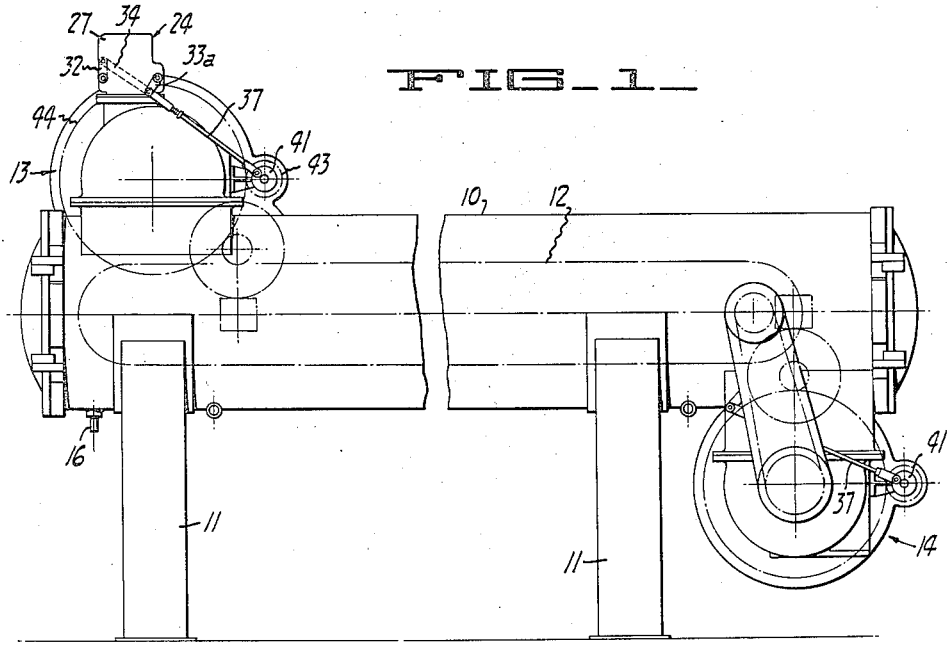
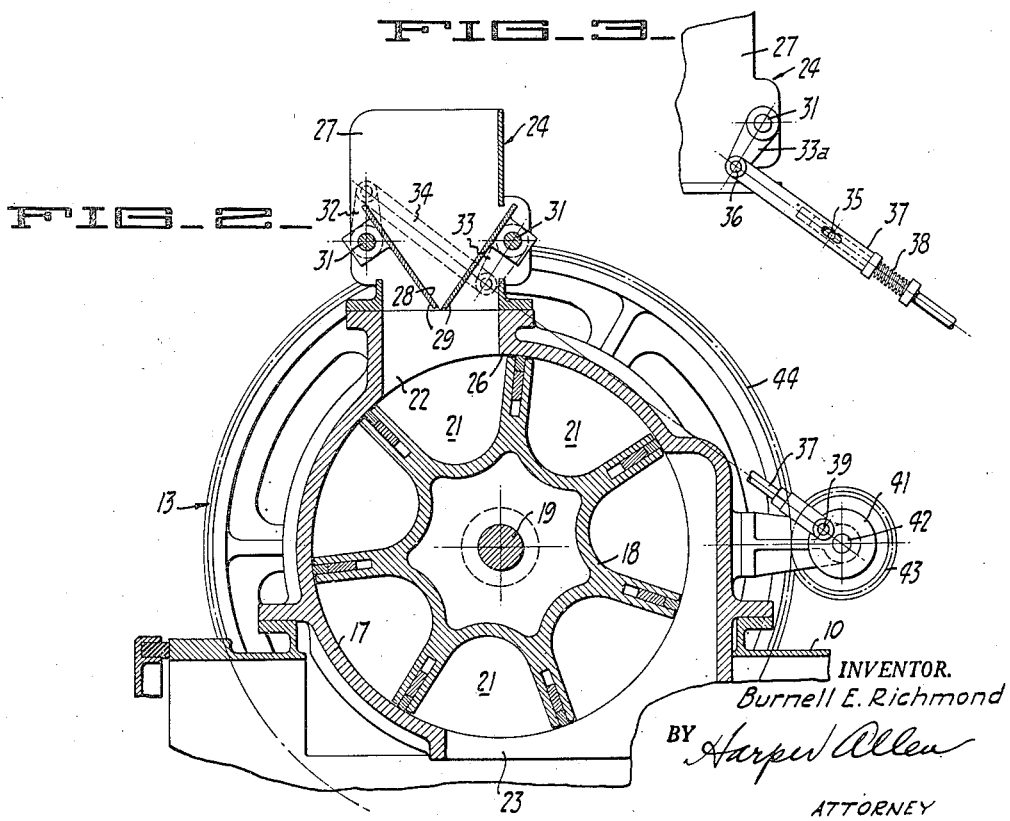
INVENTOR.
Burnell E. Richmond
BY Harper Allen
ATTORNEY Patented Mar. 7, 1944

2,343,266

UNITED STATES PATENT OFFICE 2,343,266

FEEDER FOR PRESSURE COOKERS

Burnell E. Richmond, San Jose, Calif.

Application April 20, 1942, Serial No. 439,739

5 Claims. (Cl. 198—211)

This invention is concerned with the provision of a pressure cooker for use in the processing of dried fruit such as prunes.

It is a general object of the invention to provide a pressure cooker for subjecting dried fruit such as prunes to steam under pressure.

Another object of the invention is to provide a cooker of the above character wherein an improved form of valve mechanism is provided for introducing and discharging prunes to and from the pressure cooker.

Another object of the invention is to provide a cooker of the above character having a valve mechanism which will not gum or stick because of the character of the product handled.

Another object of the invention is to provide a valve mechanism for a pressure cooker of the above character wherein dried fruit can be transferred between two zones of different pressure continuously and without sticking of the parts.

Other objects and advantages of the invention will appear from the following description of an illustrative embodiment of the invention, as illustrated in the accompanying drawing, in which:

Figure 1 is a side elevational view of a pressure cooker embodying the invention;

Figure 2 is a vertical sectional view through the intake valve mechanism of the cooker;

Figure 3 is a detail of the drive connection for the timing valve.

Referring to the drawing, the cooker includes an elongated casing 10 which is supported by suitable legs 11. Within the casing 10 a draper or conveyor 12 of suitable form is provided to which the prunes are fed by an intake valve mechanism indicated generally at 13. A discharge valve mechanism 14 is provided to receive prunes from the discharge end of the conveyor, and this valve mechanism is similar to the valve mechanism 13 at the intake of the casing.

It will be understood that the draper 12 may be of any suitable form to convey prunes in bulk through the casing 10 so that they are subjected to steam under pressure which may be supplied, for example, through a steam pipe 16 under control of a suitable thermostat (not shown).

At the feed end of the cooker, the casing 10 is in communication with the housing 17 of intake valve 13. Within the housing 17, a rotor 18 (Figure 2) is provided secured on a shaft 19 suitably journalled in the housing 17. Rotor 18 is provided with a series of pockets 21 which receive charges of prunes at an intake opening 22 and carry them to a discharge opening 23 to feed the prunes to the draper 12 without loss of pressure past the valve mechanism.

In order to insure successful operation of the valve 13 and avoid gumming and sticking of the parts, it is desirable to provide a timing valve indicated generally at 24 to place measured charges of prunes in each pocket 21 as it passes by the intake opening 22. The charges of prunes for each pocket is less than the full capacity of the pocket so that the level of prunes will be below the cut off point 26 provided by the wall of housing 17.

The timing valve 24 (Figure 2) includes a hopper 27 suitably mounted on the casing 17 to register with the intake opening 22 and having opposite side walls provided with V-shaped lower ends, as indicated at 28. Each side of the V provides a seat for a gate 29 carried by a shaft 31 suitably journalled on the hopper 27. The left hand gate 29, as viewed in Figure 2, has an upstanding arm 32, while the right hand gate is provided with a depending arm 33, the arms 32 and 33 being connected for simultaneous movement by a link 34. In this way, the gates 29 will open and close simultaneously upon operation of arms 32 and 33. An arm 33a (Figures 1 and 3) secured on the right-hand shaft 31 is pivotally connected at 36 to a link 37 which is connected at 39 (Figures 1 and 2) to a drive disc 41 mounted on a shaft 42. Shaft 42 carries a pinion 43 which meshes with gear 44 secured on shaft 19. A suitable motor drive may be provided for gear 44 and the similar drive gear of discharge valve 14.

The link 37 (Figure 3) is preferably made up of two telescoping parts urged apart by spring 38 so that gates 29 are yieldably moved to closed position. Pin and slot connection 35 between the telescoping parts of link 37 limits the extent of relative movement therebetween. In the closed position of gates 29, spring 38 is compressed slightly. In their closed positions the lower edges of gates 29 are spaced apart slightly to avoid crushing of a prune caught therebetween.

The disc 41 operates to move the gates 29 to their open position, once while each pocket 21 is passing beneath the gates in fruit receiving position and to interrupt the flow of prunes past the gates before the trailing edge of the pockets 21 passes the cut-off point 26. The gates thereafter interrupt the flow of prunes until the next succeeding pocket 21 is in position to receive the prunes.

It will be understood that prunes are fed to the timing valve 24 by suitable feed means such as a belt or shaker conveyor (not shown) which provides a relatively constant rate of speed. Similarly a suitable hopper or conveyor may be provided to receive prunes from the discharge valve 14.

I claim:

1. In a pressure cooker, a valve mechanism for carrying fruit from a zone of one pressure to a zone of a different pressure without disturbing the pressure differential therebetween, said valve comprising a member having a pocket mounted for successive movements between respective fruit receiving and fruit discharging positions, pivotally mounted gate means for controlling the feed of fruit to said valve mechanism in charges individually no greater than the capacity of said pocket, and means operable in time with the operation of said member for opening said gate means when said pocket is positioned in fruit receiving position and for closing said gate means before said pocket leaves said fruit receiving position.

2. In a pressure cooker, a valve mechanism for carrying fruit from a zone of one pressure to a zone of a different pressure without disturbing the pressure differential therebetween, said valve comprising a rotary member having a series of pockets mounted for successive movements past fruit receiving and fruit discharging positions, a pair of pivotally mounted gates for controlling the feed of fruit to said valve mechanism in charges individually no greater than the capacity of said pockets, means connecting said gates for coordinated operation, and means operable in time with the operation of said member for opening said gates when each pocket is positioned in fruit receiving position and for closing said gates before each pocket leaves fruit receiving position.

3. In a pressure cooker for subjecting dried fruit such as prunes to steam pressure, having a conveyor therein, the combination with a feed valve for depositing the prunes on said conveyor without loss of steam pressure in said cooker, said feed valve being continuously rotated and having a series of peripheral pockets for carrying the prunes; of a measuring device positioned to transfer measured quantities of prunes to said feed valve, and means for operating said measuring device in time with the operation of said rotary feed valve for limiting transferring of said measured quantities of prunes to said feed valve at any time to a quantity of prunes no greater than that which can be completely held by one of said pockets.

4. In a pressure cooker for subjecting dried fruit such as prunes to steam pressure, having a conveyor therein, the combination with a feed valve for depositing the prunes on said conveyor without loss of steam pressure in said cooker, said feed valve being continuously rotated and having a series of peripheral pockets for carrying the prunes; of a measuring device for transferring to said feed valve individual measured charges of prunes less in quantity than the capacity of an individual one of said pockets, and means for operating said measuring device in time with the operation of said rotary feed valve for limiting transferring of charges of prunes to periods during which the pockets are positioned to receive the charges.

5. In a pressure cooker for subjecting dried fruit such as prunes to steam under pressure, a feed valve comprising a casing having an intake passage and a discharge outlet, means for transferring the prunes from said intake to said discharge without loss of pressure comprising a continuously rotated valve member having peripheral pockets therein, a measuring device for measuring the amount of prunes in each of said pockets and only partially filling each of said pockets comprising a hopper having an outlet communicating with said intake passage and said feed valve, a pair of oscillatable gates to control the movement of prunes thru said outlet, said gates when in the closed position having juxtaposed edges mutually spaced apart sufficiently to prevent crushing of prunes therebetween but sufficiently close together to prevent passage of prunes therebetween, said juxtaposed edges being disposed at a distance from the periphery of said rotary feed valve member, and means operated in timed relation with the rotation of said feed valve for opening and closing said gates to measure the quantity of prunes deposited in each of said pockets.

BURNELL E. RICHMOND.